Figure 1:
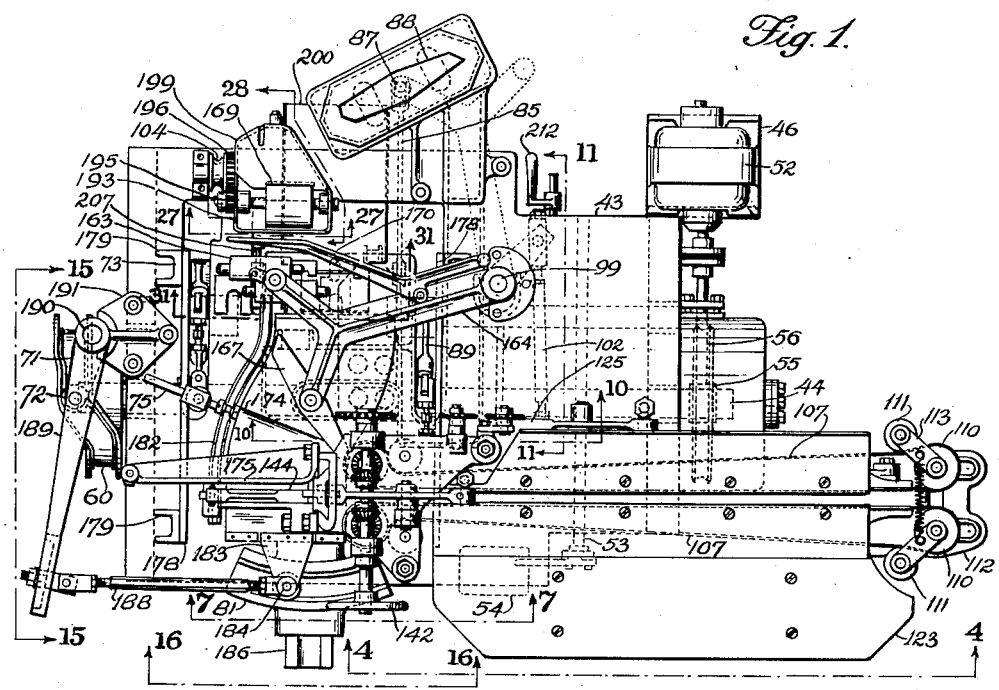

May 25, 1926.  
R. E. RUNDELL  
1,586,330  
TOSCANI CIGAR MACHINE  
Filed August 28, 1925  
7 Sheets-Sheet 1

INVENTOR  
Rupert E. Rundell  
BY  
Sydney Prescott  
ATTORNEY

May 25, 1926. 1,586,330
R. E. RUNDELL
TOSCANI CIGAR MACHINE
Filed August 28, 1925 7 Sheets-Sheet 2
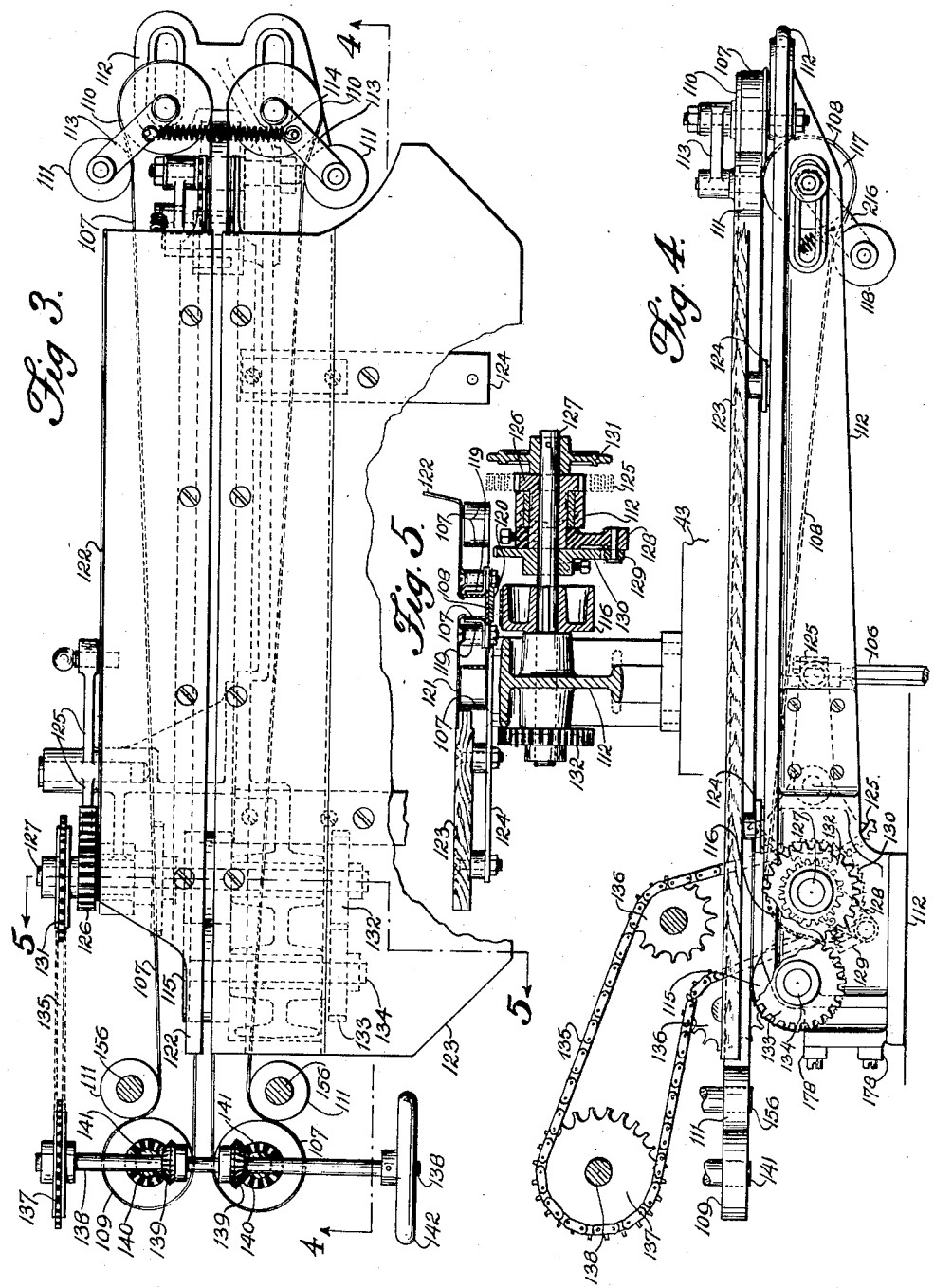

May 25, 1926.  1,586,330
R. E. RUNDELL
TOSCANI CIGAR MACHINE
Filed August 28, 1925    7 Sheets-Sheet 3
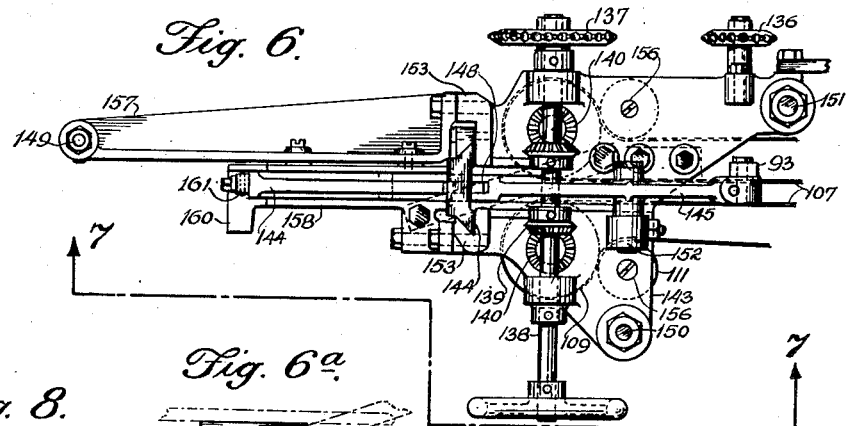
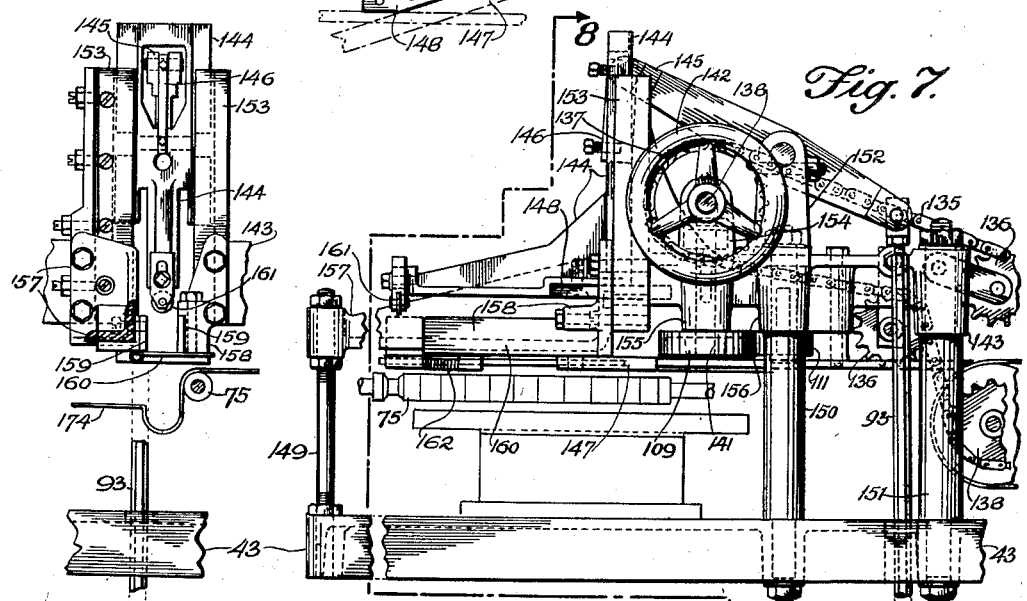
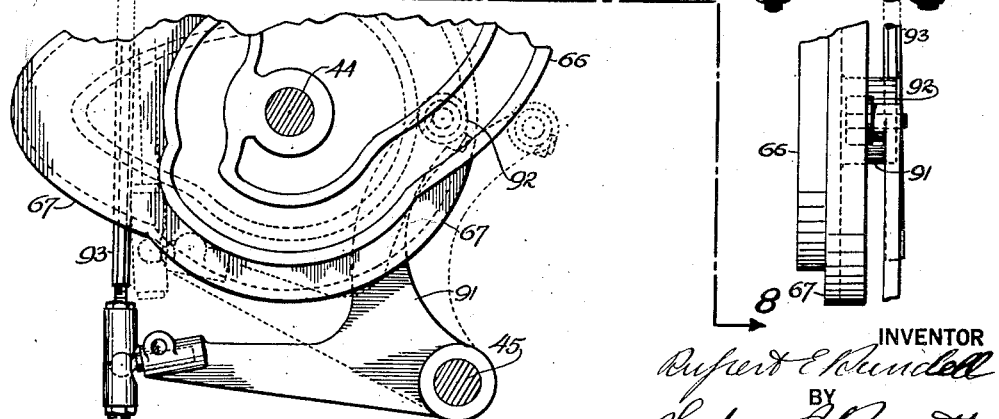
INVENTOR
Rupert E Rundell
BY
Sydney H Prescott
ATTORNEY May 25, 1926.  
R. E. RUNDELL  
TOSCANI CIGAR MACHINE  
Filed August 28, 1925  
1,586,330  
7 Sheets-Sheet 4
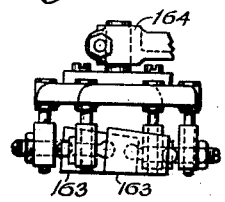
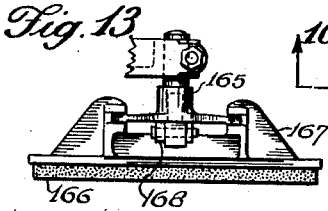
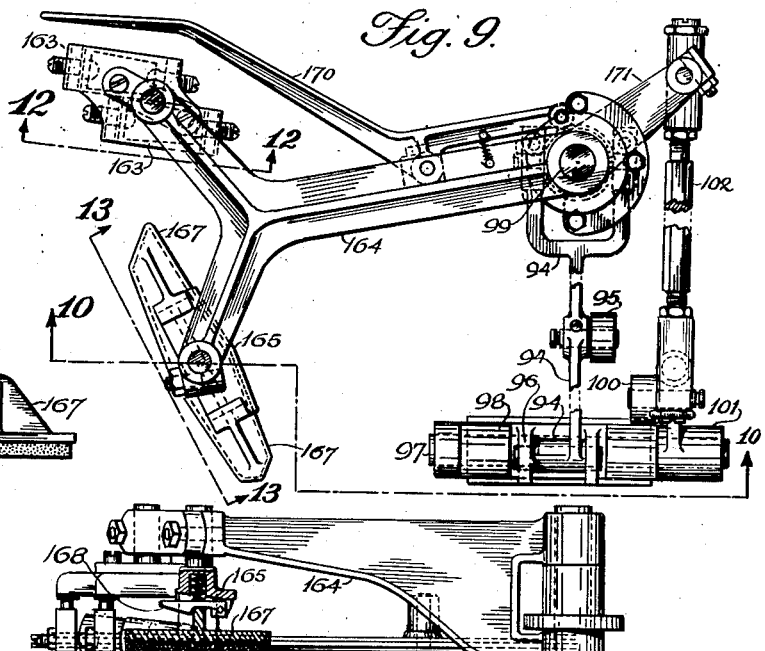
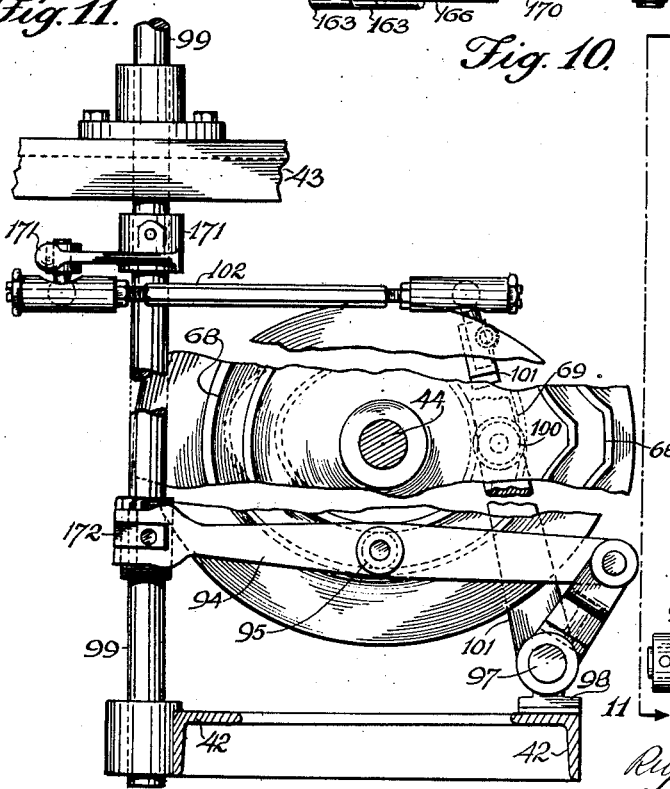
INVENTOR  
Rupert E. Rundell  
BY  
Sydney Prescott  
ATTORNEY May 25, 1926. 1,586,330
R. E. RUNDELL
TOSCANI CIGAR MACHINE
Filed August 28, 1925   7 Sheets-Sheet 5

INVENTOR
Rupert E. Rundell
BY
Sydney Prescott
ATTORNEY

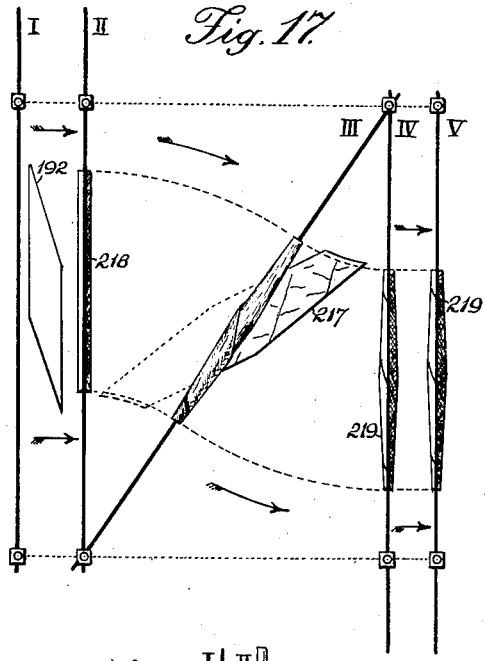
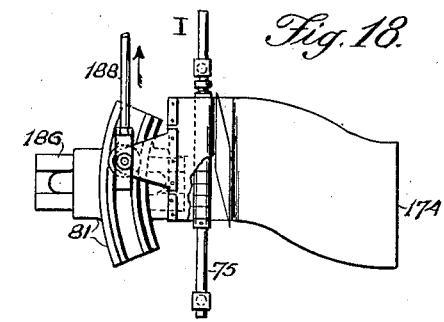
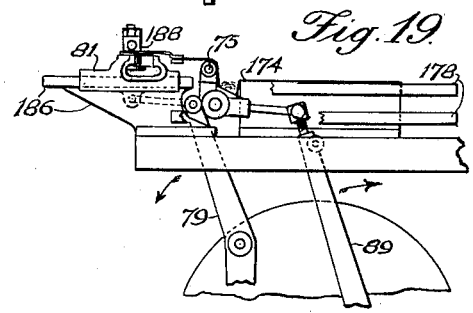
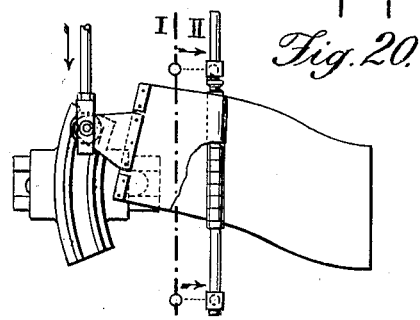
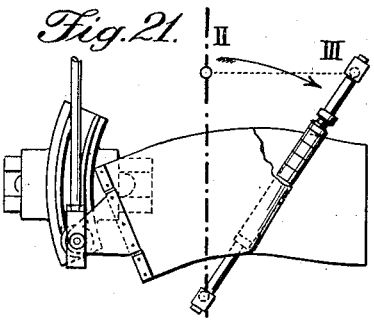
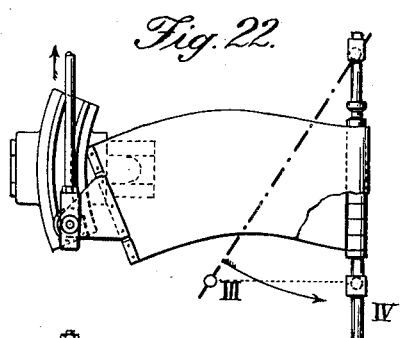
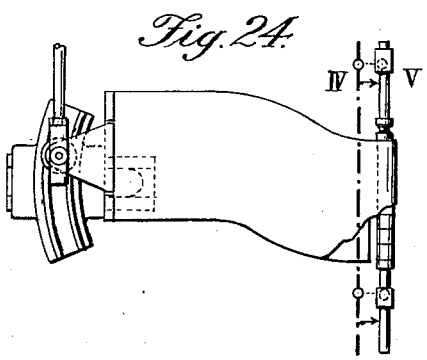
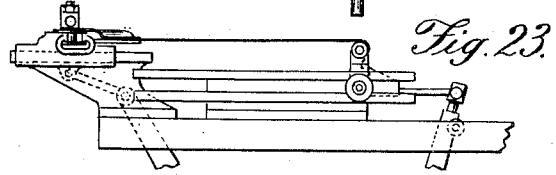

May 25, 1926.　　　　　　　　　　　　　　　　　　1,586,330
R. E. RUNDELL
TOSCANI CIGAR MACHINE
Filed August 28, 1925　　　　7 Sheets-Sheet 7

INVENTOR
Rupert E. Rundell
BY
Sydney H. Prescott
ATTORNEY

Patented May 25, 1926.

1,586,330

UNITED STATES PATENT OFFICE.

RUPERT E. RUNDELL, OF ROCKVILLE CENTER, NEW YORK, ASSIGNOR TO INTERNATIONAL CIGAR MACHINERY COMPANY, A CORPORATION OF NEW JERSEY.

TOSCANI-CIGAR MACHINE.

Application filed August 28, 1925. Serial No. 53,145.

This invention relates to an improved Toscani cigar machine.

A machine for making Toscani cigars is known in the art. In its operation, individual charges of filler are severed from a continuous stream, transferred to a compressing device, there compressed, then transferred to a rolling device where a wrapper is applied to it. In its operation also, a wrapper is cut from a leaf, transferred from the cutting bed to a wrapper carrier and by the latter transferred to a wrapping mechanism in which the charge is rolled. Paste is applied to the wrapper while it is supported by the wrapper carrier. There are so many transfers of the delicate wrapper which must always be handled in outstretched condition that it becomes more or less wrinkled during transfers, and this militates against a smooth appearing product. Also, there are so many transfers of the filler charges that the leaf sections of which it is made up become displaced during transfers, and this militates against an evenly distributed filler in the finished product.

It has now been discovered that the defects of the earlier machine may be overcome by causing a Toscani cigar machine to handle its filler and its wrapper in a radically different way, and the main object of the present invention is the production of an improved Toscani cigar machine in which the defects of the earlier machine are overcome, resulting in an improved product at a materially lower cost. With this and other objects not specifically mentioned in view, the invention consists in certain constructions and combinations which will be hereinafter fully described and then specifically pointed out in the claims.

Figure 2:
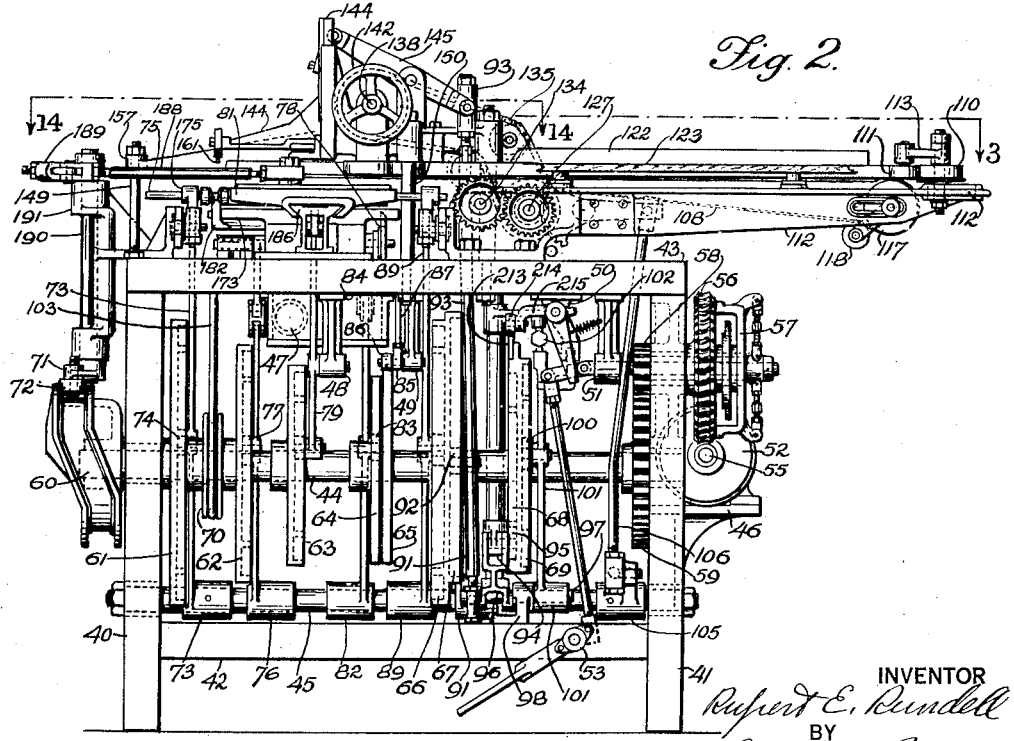
Figure 14:
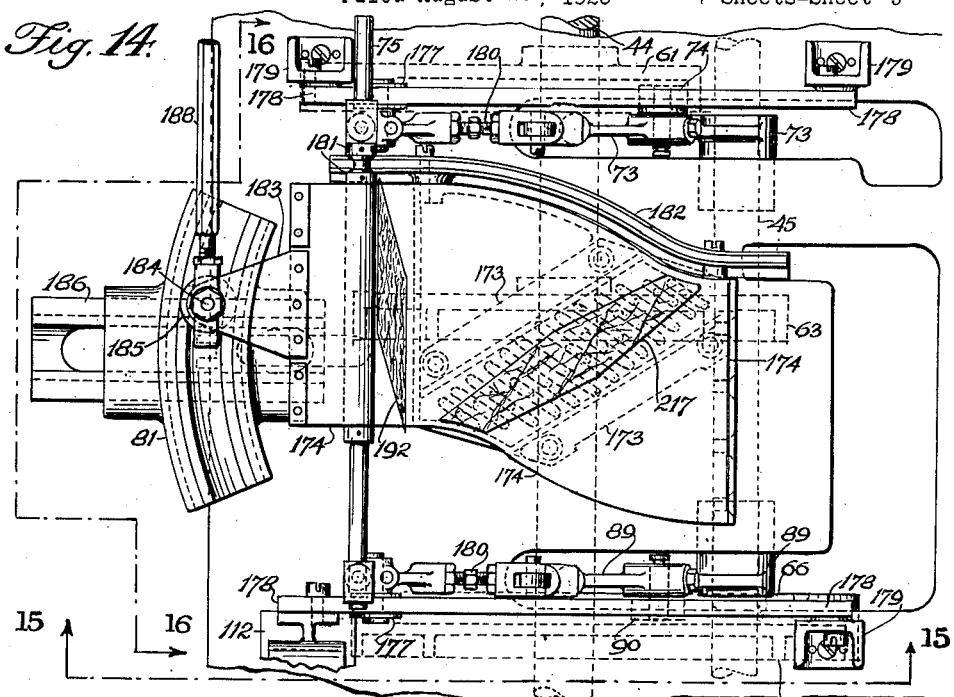
Figure 15:
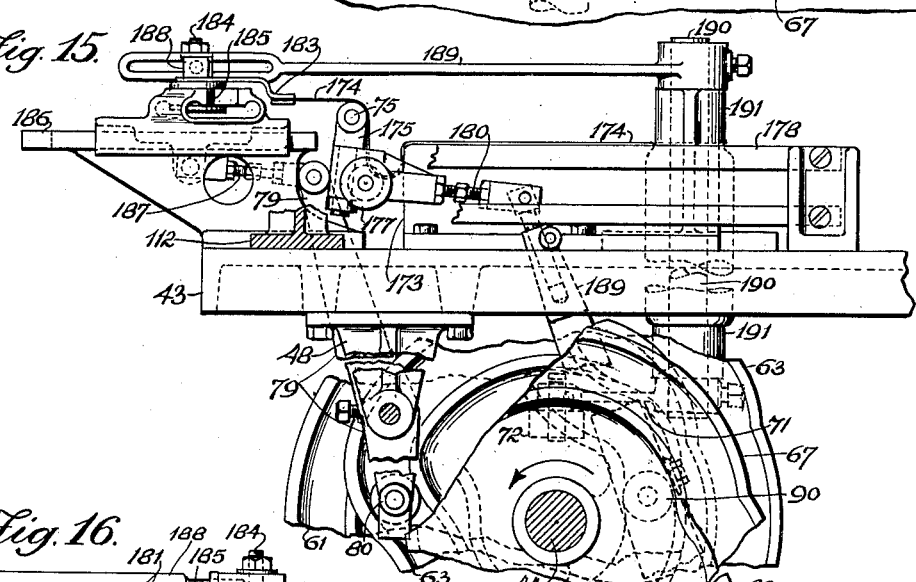
Figure 16:
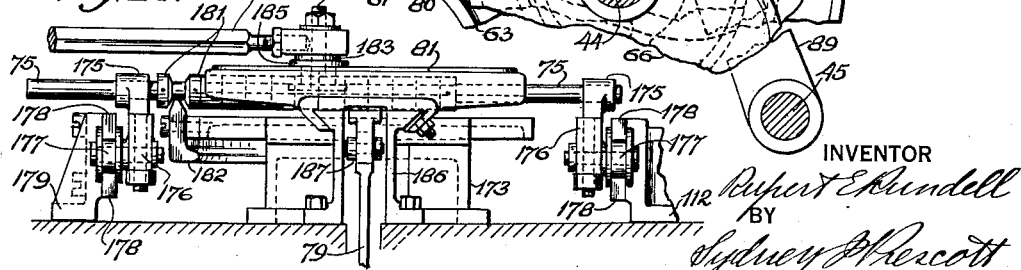
Figure 25:
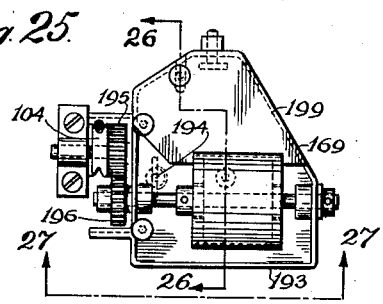
Figure 26:
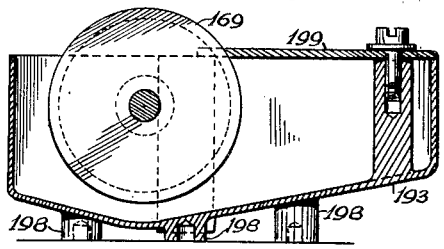
Figure 27:
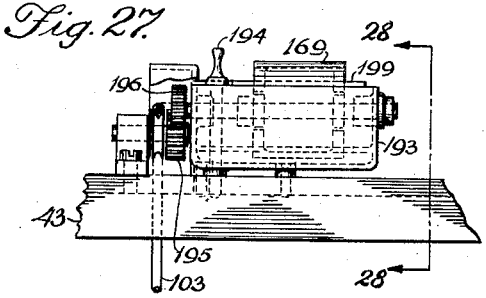
Figure 28:
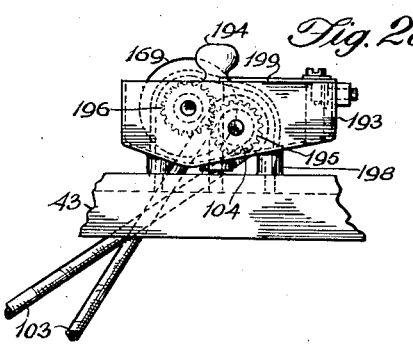
Figure 29:
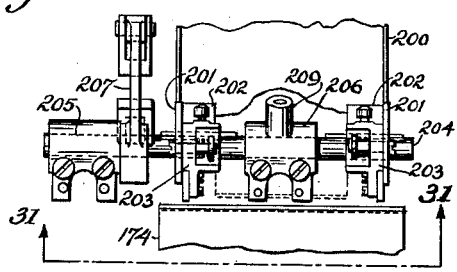
Figure 30:
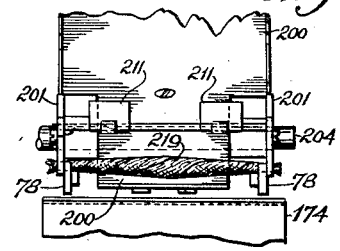
Figure 31:
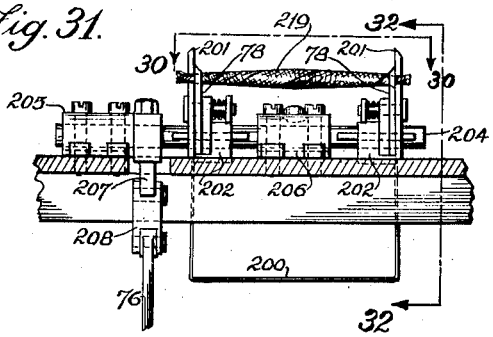
Figure 32:
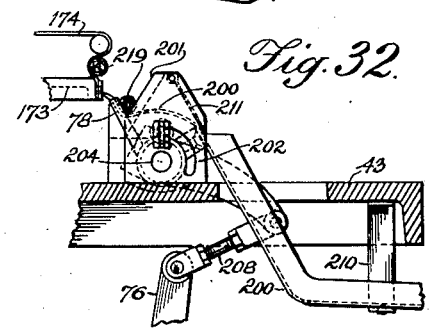

In the accompanying drawings which form a part of this specification and in which like characters of reference indicate the same or like parts, Fig. 1 is a plan view of a machine constructed in accordance with the invention and showing the arrangement of the different units which go to make up the machine; Fig. 2 is an elevation of the machine showing the arrangement of the motor drive, cams and operating levers; Fig. 3 is a plan view of the filler feed; Fig. 4 is an elevation of the filler feed; Fig. 5 is a cross section on the line 5—5 in Fig. 3, showing the drive mechanism of the filler feed; Fig. 6 is a plan view of the filler cutoff; Fig. 6ª is a detail view of the cutoff knife and ledger plate shown in Fig. 6; Fig. 7 is a front elevation of the filler cutoff; Fig. 8 is a side elevation of the filler cutoff, viewed from the line 8—8 in Fig. 7; Fig. 9 is a plan view of the wrapper cutter and carrier; Fig. 10 is a front elevation of the wrapper cutter and carrier; Fig. 11 is a side elevation showing the cam and actuating levers for operating the wrapper cutter and carrier; Fig. 12 is an elevation of the wrapper cutting rollers; Fig. 13 is an elevation of the wrapper carrier head; Fig. 14 is a plan view of the forming mechanism; Fig. 15 is a side elevation of the forming mechanism, showing the cams and levers for operating the forming roller, the chianti belt shifter, and belt stretcher; Fig. 16 is a front elevation of the forming mechanism, showing the arrangement of the forming roller, belt shifter and belt stretcher; Figs. 17 to 24 are diagrams showing the successive positions of the forming roller and chianti belt while a charge is being formed into a cigar; Fig. 25 is a plan view of the pasting mechanism; Fig. 26 is a cross section of the paster showing the reservoir, the paste applying roller, and the doctor; Fig. 27 is a front elevation of the paster; Fig. 28 is a side elevation of the paster; Fig. 29 is a plan view of the trimming and ejecting mechanism with part of the ejecting chute broken away; Fig. 30 is a plan view of the trimming knives and ejecting chute; Fig. 31 is a front elevation of the trimming and ejecting mechanism; and Fig. 32 is a side elevation of the trimming and ejecting mechanism.

In carrying the invention into effect, there is provided a wrapper carrier which travels from wrapper receiving position to wrapper delivering position, means for applying paste to the operating surface of said carrier, means for cutting and applying a wrapper to the pasted surface to cause said wrapper to adhere thereto and be carried thereby from wrapper receiving position immediately over the cutting bed to wrapper delivering position immediately over cigar forming means, cigar forming means to which the wrapper carrier directly delivers paste-covered wrappers, and means for supplying filler to said forming means, thus eliminating the necessity for compressing the filler and more than half of the filler and wrapper transfers heretofore thought to be necessary, and by means of simplified and cheaper mechanism. In the best constructions contemplated, the wrapper carrier is provided with an operating surface of sponge rubber which has been found to give the best results when covered with paste; the paste applying means includes a stationary reservoir and a paste applying roller in the path of said operating surface and partly submerged in said reservoir, the wrapper carrier receiving paste from the roller as it travels toward the cutting bed to receive therefrom a cut wrapper; the wrapper applying means includes the inner platen of a suction cutting bed so that but one transfer is necessary in order to place the wrapper on the carrier; the forming means is of the chianti belt type and has suction means for drawing the wrapper from the carrier against the resistance of the paste; and means are provided for trimming the wrapped cigar as it is ejected from the machine. All the above mentioned parts and means may be widely varied in construction within the scope of the claims, for the particular structure selected to illustrate the invention is but one of many possible concrete embodiments of the same. The invention therefore is not to be restricted to the precise details of the structure shown and described.

*The main drives* (Fig. 1 and 2).—The side frames 40 and 41 of the machine are held together by the cross piece 42 and support the top plate or machine bed 43, the cam shaft 44, the cam lever shaft 45, and the motor bracket 46. From the bed 43 are suspended the suction box 47 of well known construction and operation, the lever brackets 48 and 49, the control shaft bearings 50, and the clutch shaft bearing 51. The side frame 41 carries the bracket 46 upon which the driving motor 52 is mounted. In the cross piece 42 is journaled the foot control shaft 53 operated by the pedal 54.

The motor 52 is coupled to the worm 55 meshing with the worm-wheel 56 forming a part of a clutch 57, and through it drives the pinion 58 meshing with the gear 59 on the cam shaft 44, on which are mounted the cams 60, 61, 62, 63, 64, 65, 66, 67, 68 and 69, and also the belt pulley 70.

The cam 60, by means of a lever 71 and cam roller 72 actuates the chianti belt shifter of the cigar forming means or mechanism. The cam 61, by means of a cam lever 73 and cam roller 74, actuates the left hand end of the roller of the forming means or mechanism. The cam 62, by means of a cam lever 76 and cam roller 77, operates the trimming knives 78. The cam 63, by means of a cam lever 79, fulcrumed in the bracket 48 and having a cam roller 80, operates the chianti belt stretcher 81. The cam 64, by means of a cam lever 82 and cam roller 83, actuates the slide valve 84 of the suction box 47, cutting off the suction at intervals in the usual manner. The cam 65 engages with a horizontal lever 85 having a cam roller 86, and through a vertical rod 87 controls the vertical movement of the inner platen 88 of the cutting bed by means of which a wrapper is transferred from the cutting bed to the wrapper carrier. The cam 66, through the lever 89 and cam roller 90, actuates the right hand end of forming roller 75. The cam 67, engaging with the bell crank lever 91 through the roller 92, controls the vertical motion of the rod 93, which operates the filler cutoff knife. The cam 68 actuates the horizontal lever 94 having the cam roller 95 and being supported through link 96 by the shaft 97 in the bracket 98 attached to the cross frame 42, the said lever 94 operating to alternately lift and lower the vertical supporting shaft 99 of the wrapper carrier. The cam 69 engages with the roller 100 of the lever 101, the latter being fulcrumed on the shaft 97 in the bracket 98, and being connected with the horizontal rod 102 which turns the wrapper carrier. The pulley 70 of the cam shaft 44 drives a belt 103 which in turn drives the pulley 104 actuating the paster roller. The cam levers 73, 76, 82, 89 and 91 are fulcrumed on the lever shaft 45 which also carries an arm 105 to which is connected a rod 106 which operates the filler feed, the movement of the lever 105 being derived from the cam 61 through the lever 73, the latter as well as the arm 105 being pinned to the shaft 45, while all the other cam levers on said shaft are loose thereon.

*The filler feed* (Figs. 3, 4 and 5).—The filler tobacco is fed by hand into the narrow channel formed by two vertical side belts 107 and the horizontal bottom belt 108, the side belts being guided by the pulleys 109 and 110 and by the idlers 111, in a manner well known in cigarette machine feed mechanisms. The left hand pulleys 109 are rigidly supported from the frame of the filler cutoff, while the right hand pulleys 110 are adjustably fastened to the frame 112 of the filler feed. The right hand idlers 111 are suspended from brackets 113 fulcrumed on the pulley shafts and held in tension against the belts by spring 114. The bottom belt 108 is guided by the pulleys 115, 116 and 117, the right hand pulley 117 being adjustable and having the idler 118 attached to its shaft by the spring-tensioned arm 216.

The side belts are prevented from spreading apart by the strips 119, and the bottom belt is prevented from sagging by the strip 120, these strips being supported from the frame 112. Spilling of tobacco is avoided by the cover plates 121 and 122; and a table 123, which is supported by the strips 124 attached to the frame 112, is provided for convenience in feeding.

Intermittent motion is imparted to the feed belts by means of the toothed segment 125 which is swung up and down by the rod 106 connected to the arm 105 on the lever shaft 45 (Fig. 2). The segment 125 meshes with the spur gear 126 which is loose on the shaft 127, and to the hub of which is attached an arm 128 carrying a pawl 129 engaging a ratchet 130, the latter being fixedly mounted on the shaft 127, thereby transmitting motion to the pulley 116, sprocket 131 and spur gear 132. The gear 132 meshes with a gear 133 on a shaft 134 which carries the bottom belt pulley 115. The sprocket 131 is connected by a chain 135, running over idlers 136, with a sprocket 137 on a horizontal shaft 138 supported by the cut-off frame and having bevel gears 139 meshing with corresponding gears 140 on vertical shafts 141 which carry the drive pulleys 109 of the side belts 107. The shaft 138 is provided with the hand wheel 142 for manipulating the filler feed by hand when the driving clutch is disengaged. The throw of the segment 125 is adjustable in a well known manner in order to vary the length of the filler charge when desired.

*The filler cutoff* (Figs. 6, 7 and 8).—The filler cutoff consists of the frame 143, the vertical slide 144, and the actuating lever 145 attached to the slide by means of a link 146, the frame 143 having a stationary ledger plate 147, and the slide 144 carrying the cutoff knife 148.

The frame 143 is supported by posts 149, 150 and 151, all mounted on the top plate 43 of the machine frame, and has a bracket 152 for the lever fulcrum, slide-ways 153 for the knife slide 144, supports 154 for the hand-wheel shaft 138 of the filler feed, and bearings 155 for the drive shafts 141 and the idler shafts 156 of the side belt pulleys 109.

To the slide-ways 153 are attached brackets 157 and 158 which support vertical strips 159 forming continuations of the side belts 107, and a horizontal trap door 160 forming a continuation of the bottom belt 108. The slide 144 carries an adjustable roller 161 which presses down upon and opens the trap door 160 as the knife 148 descends, permitting the charge to fall into the pocket of the chianti belt, the spring 162 operating to close said door as the knife ascends, lifting the roller 161 from the door.

The lever 145 is actuated by the rod 93 which is connected with the bell crank 91 engaging by means of the roller 92 the cam 67.

*The wrapper cutter and carrier* (Figs. 9 to 13).—The wrapper is placed by hand on the cutting bed in the usual manner, and it is cut by the roller 163 which is carried by the swing arm 164 also carrying the head 165 to which is attached the sponge rubber 166 held in a frame 167 slidable on the head 165 and locked in position by means of a spring-catch 168. The wrapper carrying head differs from all others heretofore known in that neither suction nor mechanical devices are employed for the purpose of holding on the head an outstretched wrapper. For this purpose, paste is smeared all over the operating surface of the wrapper carrier, and the wrapper is held thereto by adhesion. While sponge rubber possesses the properties essential for this purpose, other substances possessing the same essential properties may be used in place thereof.

As the arm 164 moves toward the cutting bed, from the full line position to the dotted line position in Fig. 1, the sponge 166 passes over the paste roller 169, and takes paste therefrom, so that the wrapper when cut will stick to it when the head 165 is lowered into contact with the ascending inner platen 87 of the cutting bed after a wrapper has been cut. The swinging arm 164 is provided with a safety guard 170 which disengages the arm from the actuating upright shaft 99 when it meets an obstruction, as the feeder's hand, not withdrawn from the cutting bed in time. This safety guard operates in the usual manner.

The upright shaft 99 of the wrapper carrier is given a swinging movement by the cam 69 engaging, through the cam lever 101, and the connecting rod 102, with an arm 171 attached to the shaft 99; and an up and down movement by means of the cam 68, controlling lever 94, and link 172 attached to the shaft 99.

*The cigar forming mechanism* (Figs. 14 to 24).—The cigar forming mechanism consists of a reversely curved table 173, over which lies a reversely curved chianti belt 174, the forming roller 75, and suitable belt shifting and stretching means.

The forming table 173 is attached to the top plate 43 of the machine and is in communication with the suction box 47 through the suction slide valve 84 (Fig. 2), in the usual manner. The forming roller 75 is supported on each end by a trunnion-slide 175 turnable in a carriage 176 having a roller 177 operating between the guide-rails 178 attached to brackets 179 mounted on the top plate 43, in the usual manner. The carriages 176 are controlled by the levers 73 and 89 attached to them through the connecting rods 180 and fulcrumed on the lever shaft 45, the levers 73 and 89 being actuated by the cams 61 and 66, respectively. The forming roller 75 is provided with beveled collars 181 engaging the guide-rail 182 attached to the side of the forming table.

The chianti belt 174 is fastened to the shifter head 183 at one end and to the forming table 173 at the other. The shifter head 183 is pivoted on the post 184, carrying a roller 185 sliding in the arcuate groove of the belt stretcher 81, the latter being slidable on the ways 186 mounted on the top plate 43.

The belt stretcher is controlled by the lever 79 attached to it through the rod 187 and fulcrumed in a bracket 48 suspended from the top plate 43, the free end of the lever 79 carrying the roller 80 engaging the cam 63. The belt shifter is connected by the rod 188 to a lever 189 fixed on a vertical shaft 190 supported by a bracket 191 attached to the top plate 43. The shaft 190, at its lower end, carries the arm 71 which, through the roller 72, engages the cam 60. The belt shifter lever 189 is provided with a slot enabling adjustment of the link for connecting rod 188, thereby adapting the shifter for different sizes and shapes of cigars.

In Fig. 17, the five principal positions of the forming roller 75 are shown. I is the starting position from which the roller is moved across the filler charge 192, then lying in the pocket of the chianti belt, as seen in Figs. 18 and 19, the belt picking up the charge and loosely rolling it into cylindrical shape during the first part of the cigar forming operation, position II of the forming roller being parallel with the starting position, Fig. 20. As the roller 75 is moved from position I to position II, the belt stretcher is moved outward, and the belt shifter is moved to the right, as shown by the arrows in Figs. 18 and 19. Arrived at position II, the right hand carriage of the forming roller is held stationary while the left hand carriage is moved forward, thus bringing the roller to the oblique position III, shown in Fig. 21. Following this movement, the belt shifter is pulled into its extreme right hand position, thereby shaping the wrapper snugly around the tapered right hand half of the charge produced by the circular motion of the forming roller. In the oblique position III, the left hand carriage is next held stationary and the right hand carriage is moved forward into position IV, shown in Figs. 22 and 23, the circular motion of the forming roller causing a taper to be formed in the left hand half of the charge, the finished cigar, now having a taper from the centre towards each end, being expelled from the belt in position V, which is parallel with position IV, both levers 73 and 89 acting in unison during the motion shown in Fig. 24.

*The pasting mechanism* (Figs. 25 and 28).—The paster reservoir 193 is mounted on the top plate 43 and held by means of a thumbscrew 194. It contains the paste roller 169 which is rotated through the gears 195 and 196 from the pulley 104 which is driven from the pulley 70 on the cam shaft 44 by the belt 103. The proper position of the paste reservoir is automatically secured by the dowels 197 inserted in the top-plate 43 and projecting into the sockets 198 provided for this purpose in the paste reservoir. The box or reservoir is partly covered by the doctor or scraper 199 which fits around the paste roller 169.

*The trimming mechanism and ejector* (Figs. 29 to 32).—The cigar, upon being formed, is ejected from the chianti belt on to the curved upward extension of the chute 200 upon which it rolls into engagement with the stationary knives or ledger plates 201 supported by the uprights 202. Engaging the ledger plates 201 are swinging knives 78, resiliently fastened to the arms 203 adjustably carried by the shaft 204, journaled in bearings 205 and 206 and having an arm 207 connected by a link 208 with the lever 76 which is controlled by the cam 62 (Fig. 2). The bearing 206 has a projecting post 209 to one end of which one end of a chute 200 is attached, the other end of said chute being supported from the top plate 43 by means of a strap 210.

As the arm 207 is actuated by the lever 76, the knives 78 move forward, thereby trimming the ends of the cigar. The latter then rolls down the curved extension of the chute 200, passes through the doors 211, which automatically close after its passage, thus preventing the cigar from being accidentally pulled back by the trimming knives upon their return to their cutting position, and finally enters the chute 200 by which it leaves the machine.

*The controls* (Figs. 1 and 2).—The machine is equipped with the usual hand and foot controls, the pedal 54 serving to start the machine from rest to beginning of cycle, the handle 212 serving to throw out the clutch at any moment, while the cam 213 attached to the cam disk of cams 68 and 69, by engagement with the roller 214 attached to the arm 215 disengages the clutch periodically after each complete cycle during the operation of the machine.

In view of the foregoing, a detailed description of the operation of the machine is deemed unnecessary to a full understanding of the invention; and it is therefore omitted in the interest of brevity.

What is claimed is:

1. A Toscani cigar machine consisting of a traveling wrapper carrier, means for applying paste to the operating surface of said carrier, means for cutting and applying a wrapper to the pasted surface to cause said wrapper to adhere thereto and be carried thereby, cigar forming means to which said carrier delivers a paste-covered wrapper, and means for supplying filler to said forming means.

2. A Toscani cigar machine consisting of a traveling wrapper carrier, means for applying paste to the operating surface of said carrier, means for cutting and applying a wrapper to the pasted surface to cause said wrapper to adhere thereto and be carried thereby, cigar forming means to which said carrier delivers a paste-covered wrapper, and means for supplying filler to said forming means, said carrier having an operating surface of sponge rubber.

3. A Toscani cigar machine consisting of a traveling wrapper carrier, means for applying paste to the operating surface of said carrier, means for cutting and applying a wrapper to the pasted surface to cause said wrapper to adhere thereto and be carried thereby, cigar forming means to which said carrier delivers a paste-covered wrapper, and means for supplying filler to said forming means, said carrier being mounted on a swinging arm also carrying a wrapper cutting roller, and said wrapper applying means including a wrapper cutting bed coacting with said cutting roller.

4. A Toscani cigar machine consisting of a traveling wrapper carrier, means for applying paste to the operating surface of said carrier, means for cutting and applying a wrapper to the pasted surface to cause said wrapper to adhere thereto and be carried thereby, cigar forming means to which said carrier delivers a paste-covered wrapper, and means for supplying filler to said forming means, said paste applying means including a stationary reservoir and a paste applying roller in the path of said surface and partly submerged in said reservoir.

5. A Toscani cigar machine consisting of a traveling wrapper carrier, means for applying paste to the operating surface of said carrier, means for cutting and applying a wrapper to the pasted surface to cause said wrapper to adhere thereto and be carried thereby, cigar forming means to which said carrier delivers a paste-covered wrapper, and means for supplying filler to said forming means, said wrapper applying means including the inner platen of a suction wrapper cutting bed.

6. A Toscani cigar machine consisting of a traveling wrapper carrier, means for applying paste to the operating surface of said carrier, means for cutting and applying a wrapper to the pasted surface to cause said wrapper to adhere thereto and be carried thereby, cigar forming means to which said carrier delivers a paste-covered wrapper, and means for supplying filler to said forming means, said forming means being of the chianti belt type.

7. A Toscani cigar machine consisting of a traveling wrapper carrier, means for applying paste to the operating surface of said carrier, means for cutting and applying a wrapper to the pasted surface to cause said wrapper to adhere thereto and be carried thereby, cigar forming means to which said carrier delivers a paste-covered wrapper, and means for supplying filler to said forming means, said forming means including a reversely curved table, a reversely curved chianti belt overlying said table, a floating roller underlying said belt and overlying said table, and means for reversely swinging said roller as it moves over said table.

8. A Toscani cigar machine consisting of a traveling wrapper carrier, means for applying paste to the operating surface of said carrier, means for cutting and applying a wrapper to the pasted surface to cause said wrapper to adhere thereto and be carried thereby, cigar forming means to which said carrier delivers a paste-covered wrapper, and means for supplying filler to said forming means, said forming means being of the suction chianti belt type.

9. A Toscani cigar machine consisting of a traveling wrapper carrier, means for applying paste to the operating surface of said carrier, means for cutting and applying a wrapper to the pasted surface to cause said wrapper to adhere thereto and be carried thereby, cigar forming means to which said carrier delivers a paste-covered wrapper, and means for supplying filler to said forming means, said filler supplying means including means for advancing a continuous stream of filler, and means for severing individual charges from said stream and delivering them directly to said forming means.

10. A Toscani cigar machine consisting of a traveling wrapper carrier, means for applying paste to the operating surface of said carrier, means for cutting and applying a wrapper to the pasted surface to cause said wrapper to adhere thereto and be carried thereby, cigar forming means to which said carrier delivers a paste-covered wrapper, means for supplying filler to said forming means, and means for trimming the finished cigar.

In testimony whereof, I have signed my name to this specification.

RUPERT E. RUNDELL.